US008830085B2

(12) United States Patent
Edwardson et al.

(10) Patent No.: US 8,830,085 B2
(45) Date of Patent: Sep. 9, 2014

(54) MONITORING TRAFFIC SIGNAL PREEMPTION

(75) Inventors: David John Edwardson, Shoreview, MN (US); David R. Johnson, Oakdale, MN (US); Kevin Clare Eichhorst, Owatonna, MN (US); Patrick Keenan Cosgrove, Apple Valley, MN (US); Nicole Maria Montgomery, Woodbury, MN (US)

(73) Assignee: Global Traffic Technologies, LLC, St. Paul, MN (US)

( * ) Notice: Subject to any disclaimer, the term of this patent is extended or adjusted under 35 U.S.C. 154(b) by 1041 days.

(21) Appl. No.: 12/617,048

(22) Filed: Nov. 12, 2009

(65) Prior Publication Data

US 2011/0109477 A1 May 12, 2011

(51) Int. Cl.

| | |
|---|---|
| ***G08G 1/07*** | (2006.01) |
| ***G08G 1/00*** | (2006.01) |
| ***G08G 1/01*** | (2006.01) |
| ***G06G 7/78*** | (2006.01) |
| ***F41G 9/00*** | (2006.01) |
| ***G08G 1/16*** | (2006.01) |
| ***G05D 1/00*** | (2006.01) |
| ***G08G 1/087*** | (2006.01) |

(52) U.S. Cl.

CPC .................................... *G08G 1/087* (2013.01)
USPC ........... 340/906; 340/902; 340/916; 340/917; 340/933; 340/935; 701/300; 701/302; 701/301; 701/23

(58) Field of Classification Search

USPC ......... 340/907, 906, 909, 910, 911, 924, 988, 340/990, 991, 993, 904, 539, 914, 917; 455/67.5, 67.1, 133, 227, 228, 32.1; 701/201, 202, 207, 208, 213, 117, 118, 701/119, 220

See application file for complete search history.

(56) References Cited

U.S. PATENT DOCUMENTS

| | | |
|---|---|---|
| 5,187,476 A | 2/1993 | Hamer |
| 5,202,683 A | 4/1993 | Hamer et al. |
| 5,539,398 A | 7/1996 | Hall et al. |
| 5,602,739 A | 2/1997 | Haagenstad et al. |

(Continued)

FOREIGN PATENT DOCUMENTS

| | | |
|---|---|---|
| DE | 198 42 912 | 3/2000 |
| WO | 2005/094544 | 10/2005 |
| WO | WO 2005094544 A2 * | 10/2005 |

OTHER PUBLICATIONS

Aug. 25, 2008, Global Traffic Technologies LLC 2008. *Opticom™ GPS System*. 1) Opticom GPS System Overview, pp. 1-23. 2) Vehicle Name, pp. 1-19. 3) Intersection Name, pp. 1-35. 4) Mapping Quick Guide, pp 1-24. 5) Map Approach, pp. 1-3.

*Primary Examiner* — Jennifer Mehmood
*Assistant Examiner* — Mirza Alam
(74) *Attorney, Agent, or Firm* — Crawford Maunu PLLC

(57) ABSTRACT

Approaches for monitoring traffic signal preemption at one or more intersections. According to one embodiment, a road map that includes a plurality of roads and intersections is displayed with a computer system. Preemption data periodically received by the computer system from at least one preemption controller at a respective intersection is used to update the road map. In response to the preemption data, the road map is updated to include a traffic signal icon at the respective intersection and a vehicle icon at a location on the map corresponding to a location of a vehicle transmitting a preemption request as indicated by the preemption data.

19 Claims, 5 Drawing Sheets

(56) References Cited

U.S. PATENT DOCUMENTS

| | | | | |
|---|---|---|---|---|
| 6,064,319 | A | 5/2000 | Matta | |
| 6,621,420 | B1 | 9/2003 | Poursartip | |
| 6,985,090 | B2 | 1/2006 | Ebner et al. | |
| 7,307,547 | B2 | 12/2007 | Schwartz | |
| 7,327,280 | B2 * | 2/2008 | Bachelder et al. | 340/906 |
| 7,333,028 | B2 | 2/2008 | Schwartz | |
| 7,417,560 | B2 | 8/2008 | Schwartz | |
| 7,515,064 | B2 | 4/2009 | Schwartz | |
| 2004/0054513 | A1 * | 3/2004 | Laird et al. | 703/8 |
| 2004/0196162 | A1 * | 10/2004 | Brooke | 340/906 |
| 2005/0035878 | A1 * | 2/2005 | Vassilevsky | 340/902 |
| 2005/0264431 | A1 * | 12/2005 | Bachelder | 340/906 |
| 2006/0217885 | A1 * | 9/2006 | Crady et al. | 701/213 |
| 2008/0266136 | A1 * | 10/2008 | Diba | 340/906 |
| 2008/0316055 | A1 * | 12/2008 | Bachelder et al. | 340/906 |

* cited by examiner

MONITORING TRAFFIC SIGNAL PREEMPTION

FIELD OF THE INVENTION

The present invention is generally directed to traffic control preemption systems.

BACKGROUND

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have in the past typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle.

Traffic control preemption systems assist authorized vehicles (police, fire and other public safety or transit vehicles) through signalized intersections by making a preemption request to the intersection controller. The controller will respond to the request from the vehicle by changing the intersection lights to green in the direction of the approaching vehicle. This system improves the response time of public safety personnel, while reducing dangerous situations at intersections when an emergency vehicle is trying to cross on a red light. In addition, speed and schedule efficiency can be improved for transit vehicles.

There are presently a number of known traffic control preemption systems that have equipment installed at certain traffic signals and on authorized vehicles. One such system in use today is the OPTICOM® system. This system utilizes a high power strobe tube (emitter), located in or on the vehicle, that generates light pulses at a predetermined rate, typically 10 Hz or 14 Hz. A receiver, which includes a photodetector and associated electronics, is typically mounted on the mast arm located at the intersection and produces a series of voltage pulses, the number of which are proportional to the intensity of light pulse received from the emitter. The emitter generates sufficient radiant power to be detected from over 2500 feet away. The conventional strobe tube emitter generates broad spectrum light. However, an optical filter is used on the detector to restrict its sensitivity to light only in the near infrared (IR) spectrum. This minimizes interference from other sources of light.

Intensity levels are associated with each intersection approach to determine when a detected vehicle is within range of the intersection. Vehicles with valid security codes and a sufficient intensity level are reviewed with other detected vehicles to determine the highest priority vehicle. Vehicles of equivalent priority are selected in a first come, first served manner. A preemption request is issued to the controller for the approach direction with the highest priority vehicle travelling on it.

Another common system in use today is the OPTICOM GPS priority control system. This system utilizes a GPS receiver in the vehicle to determine location, speed and heading of the vehicle. The information is combined with security coding information that consists of an agency identifier, vehicle class, and vehicle ID and is broadcast via a proprietary 2.4 GHz radio.

An equivalent 2.4 GHz radio located at the intersection along with associated electronics receives the broadcasted vehicle information. Approaches to the intersection are mapped using either collected GPS readings from a vehicle traversing the approaches or using location information taken from a map database. The vehicle location and direction are used to determine on which of the mapped approaches the vehicle is approaching toward the intersection and the relative proximity to it. The speed and location of the vehicle is used to determine the estimated time of arrival (ETA) at the intersection and the travel distance from the intersection. ETA and travel distances are associated with each intersection approach to determine when a detected vehicle is within range of the intersection and therefore a preemption candidate. Preemption candidates with valid security codes are reviewed with other detected vehicles to determine the highest priority vehicle. Vehicles of equivalent priority are selected in a first come, first served manner. A preemption request is issued to the controller for the approach direction with the highest priority vehicle travelling on it. An example GPS-based preemption system is described in U.S. Pat. No. 5,539,398.

With metropolitan wide networks becoming more prevalent, additional means for detecting vehicles via wired networks such as Ethernet or fiber optics and wireless networks such as Mesh or 802.11b/g may be available. With network connectivity to the intersection, vehicle tracking information may be delivered over a network medium. In this instance, the vehicle location is either broadcast by the vehicle itself over the network or it may be broadcast by an intermediary gateway on the network that bridges between, for example, a wireless medium used by the vehicle and a wired network on which the intersection electronics resides. In this case, the vehicle or an intermediary reports, via the network, the vehicle's security information, location, speed and heading along with the current time on the vehicle. Intersections on the network receive the vehicle information and evaluate the position using approach maps as described in the Opticom GPS system. The security coding could be identical to the Opticom GPS system or employ another coding scheme.

As used herein, the term "emitter" refers to the various types of modules capable of communicating a preemption request to a preemption controller. This includes, for example, IR light based modules, GPS based modules, and wireless network based modules.

SUMMARY

The embodiments of the present invention provide various methods and apparatus for monitoring traffic signal preemption at one or more intersections. In one embodiment a method includes displaying a road map with a computer system. The road map includes a plurality of roads and intersections. Preemption data is periodically transmitted from at least one preemption controller at a respective intersection to the computer system, and at least one traffic signal icon is displayed proximate the respective intersection on the road map. In response to receiving the preemption data, the road map is updated to include a vehicle icon at a location on the map corresponding to a location of a vehicle transmitting a preemption request as indicated by the preemption data.

In another embodiment, a system is provided for monitoring traffic signal preemption at one or more intersections. The system includes a processor and a memory arrangement coupled to the processor. The memory arrangement is configured with instructions that are executable by the processor for performing the steps including outputting data for displaying a road map which includes a plurality of roads and intersections. Preemption data is periodically requested and received from at least one preemption controller at a respective intersection. At least one traffic signal icon is displayed proximate the respective intersection on the road map. In response to receiving the preemption data, data are output for updating the road map to include a vehicle icon at a location on the map corresponding to a location of a vehicle transmitting a preemption request as indicated by the preemption data.

An article of manufacture is provided in another embodiment. The article of manufacture includes a computer-readable storage medium configured with instructions that are executable by one or more processors for monitoring traffic signal preemption at one or more intersections. The instructions when executed by the one or more processors cause the one or more processors to perform the operations of outputting data for displaying a road map which includes a plurality of roads and intersections. Preemption data are periodically transmitted from at least one preemption controller at a respective intersection to the computer system.

At least one traffic signal icon is displayed proximate the respective intersection on the road map. In response to receiving the preemption data, data are output for updating the road map to include a vehicle icon at a location on the map corresponding to a location of a vehicle transmitting a preemption request as indicated by the preemption data.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The embodiments of the present invention generally provide a method of monitoring traffic signal preemption at multiple, geographically disperse intersections. A prior system for monitoring the activity at a traffic signal controller presented a table of data that includes a vehicle identifier and GPS coordinates for each vehicle. As preemption requests are received by a traffic signal controller as a vehicle approaches the intersection, preemption data are forwarded to the monitoring system. The table of data indicates a geographical location of the vehicle along with other data from the vehicle such as heading and speed. The data in the table are often used for determining whether or not the preemption controller at the intersection, which reacts to preemption requests by signaling a request for preemption of the traffic signal, is configured and operating as intended.

Of particular interest are the approach maps configured into the preemption controller. The approach maps set the boundaries of areas from which preemption requests will be processed. If an approach map is too small, the intersection may not be cleared in time to allow the requesting vehicle to pass without stopping. If an approach map is too large, the intersection may be cleared too soon and unnecessarily interfere with traffic flow in other directions.

With tabular data one cannot easily determine whether or not an approach map is of a suitable size. For example, by displaying the GPS coordinates of a vehicle, a traffic engineer could not easily determine whether or not a vehicle is within the boundary of an approach map of the preemption controller unless the engineer had memorized the GPS coordinates of the approach map. In addition, the position in the table for the data of each vehicle is subject to change due to a drop in communication between the vehicle and the traffic signal controller, making it difficult for the engineer to track particular vehicles. The embodiments of the present invention provide approaches for easily and accurately monitoring preemption activity at geographically disperse intersections.

The monitoring of traffic signal preemption at one or more intersections includes displaying a road map with a computer system. The road map includes a plurality of roads and intersections. The area covered by the displayed road map is selected by a user. For one or more preemption controllers at respective intersections, the preemption controllers periodically transmit their preemption data to the computer system. In response to receiving the preemption data, for each active preemption, the road map is updated to include a traffic signal icon at the respective intersection and a vehicle icon at a location on the map corresponding to a location of a vehicle transmitting a preemption request as indicated by the preemption data.

Figure 1:
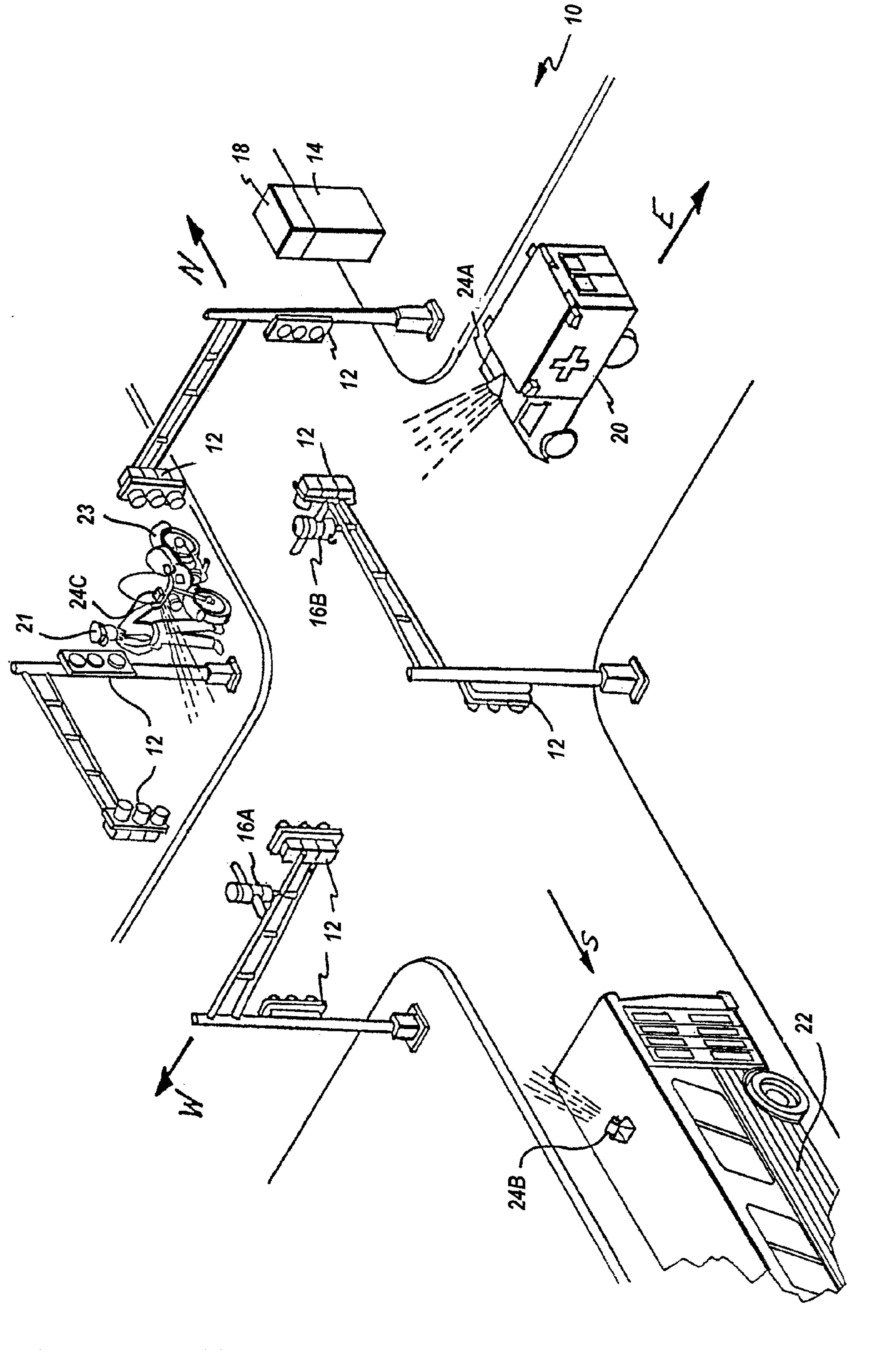
FIG. 1 is an illustration of a typical intersection having traffic signal lights.

FIG. 1 is an illustration of a typical intersection 10 having traffic signal lights 12. The equipment at the intersection illustrates the environment in which embodiments of the present invention may be used. A traffic signal controller 14 sequences the traffic signal lights 12 to allow traffic to proceed alternately through the intersection 10. The intersection 10 may be equipped with a traffic control preemption system such as the OPTICOM® Priority Control System.

The traffic control preemption system shown in FIG. 1 includes detector assemblies 16A and 16B, signal emitters 24A, 24B and 24C, a phase selector (not shown), a traffic signal controller 14, and a preemption controller 18. The detector assemblies 16A and 16B are stationed to detect signals emitted by authorized vehicles approaching the intersection 10. The detector assemblies 16A and 16B communicate with the phase selector, which is typically located in the same cabinet as the traffic signal controller 14.

In FIG. 1, an ambulance 20 and a bus 22 are approaching the intersection 10. The signal emitter 24A is mounted on the ambulance 20 and the signal emitter 24B is mounted on the bus 22. The signal emitters 24A and 24B each transmit a signal that is received by detector assemblies 16A and 16B. The detector assemblies 16A and 16B send output signals to the phase selector. The receiver circuit 18 processes the output signals from the detector assemblies 16A and 16B to determine the signal characteristics including: frequency, intensity, and security code of the signal waveform, or pulses. The security code, consisting of the vehicle class and vehicle identification is encoded in the signal by interleaving data pulses between the base frequency pulses. In GPS systems, location, speed, and heading of the vehicle are also transmitted and determined. If an acceptable frequency, intensity, and/or security code are observed, the phase selector generates a preemption request to the traffic signal controller 14 to preempt a normal traffic signal sequence. The phase selector alternately issues preemption requests to and withdraws preemption requests from the traffic signal controller, and the traffic signal controller determines whether the preemption requests can be granted. The traffic signal controller may also receive preemption requests originating from other sources, such as a nearby railroad crossing, in which case the traffic signal controller may determine that the preemption request from the other source be granted before the preemption request from the phase selector. In some embodiments of the present invention the function of the phase selector is performed solely by the traffic signal controller.

Based on the security code/priority encoded in each signal received, the phase selector determines whether to preempt traffic control. For example, the ambulance 20 may be given priority over the bus 22 since a human life may be at stake. Accordingly, the ambulance 20 would transmit a preemption request with a security code indicative of a high priority while the bus 20 would transmit a preemption request with a security code indicative of a low priority. The phase selector would discriminate between the low and high priority signals and request the traffic signal controller 14 to cause the traffic signal lights 12 controlling the ambulance's approach to the intersection to remain or become green and the traffic signal lights 12 controlling the bus's approach to the intersection to remain or become red.

Figure 2:
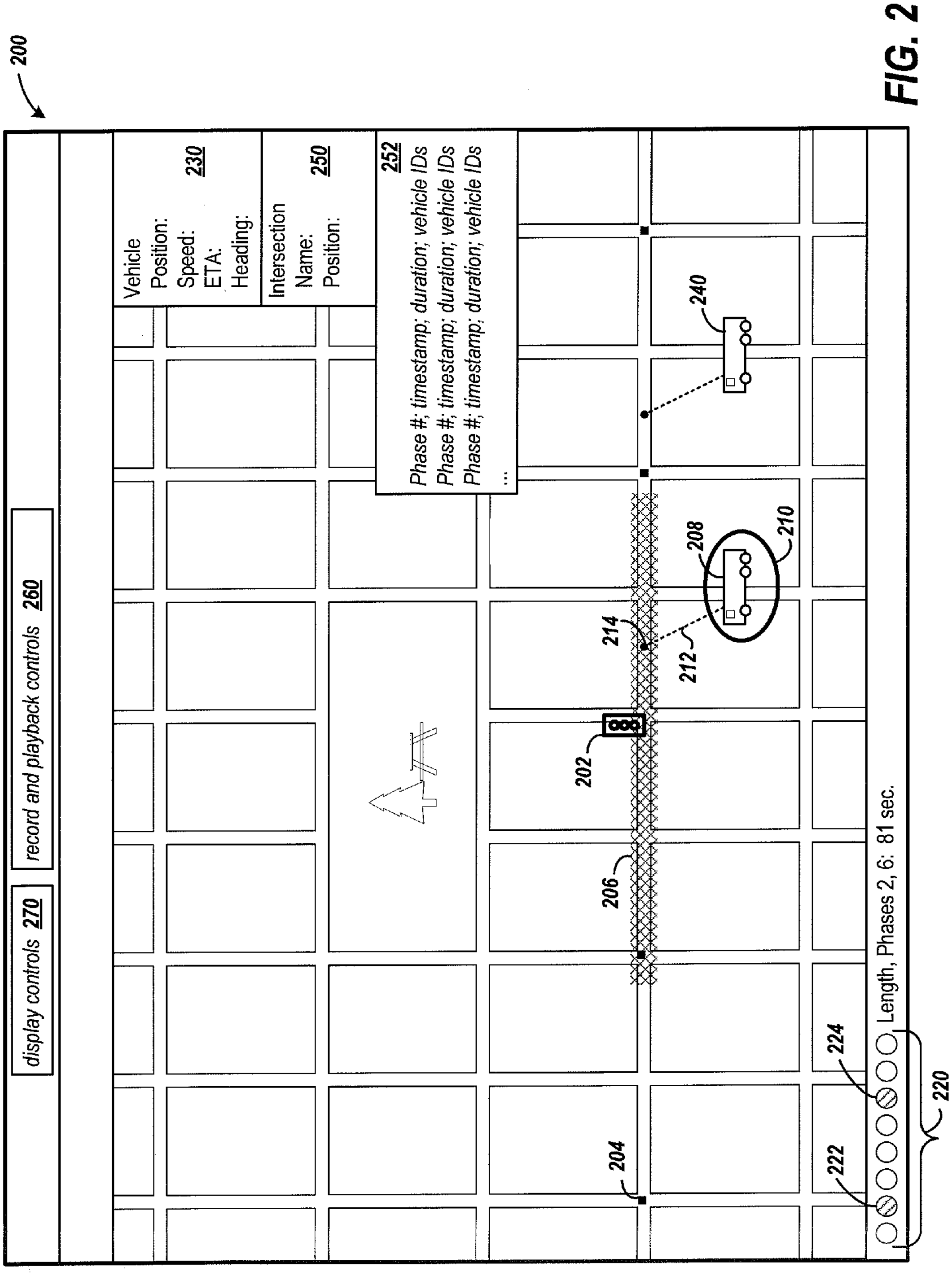
FIG. 2 shows an example display screen in which a road map is displayed in combination with traffic signal and vehicle icons for illustrating in near real-time the status of one or more preemption controllers.

FIG. 2 shows an example display screen 200 in which a road map is displayed in combination with traffic signal and vehicle icons for illustrating in near real-time the status of one or more preemption controllers. The grid represents roads surrounding a selected preemption controller.

In the example display, one preemption controller has been selected for monitoring. The selected preemption controller is represented by the traffic signal icon 202. The selected preemption controller may be in communication with other preemption controllers, which are shown as small squares in the intersections. Block 204 is an example of one of those preemption controllers. Example communications between preemption controllers include information such as identities of vehicles for which those preemption controllers have detected a preemption request. This is sometimes used to forward a preemption request from one preemption controller to another. While only one preemption controller has been selected for monitoring, it will be appreciated that multiple preemption controllers may be monitored and respective preemption data presented on a single map.

Approach maps are also displayed for the preemption controller being monitored. The approach maps are shown collectively as crosshatched area 206. It will be appreciated that approach maps may be defined for all approaches to an intersection, even though the example shows maps for approaches only from the left and right of the intersection.

In response to a request for preemption data, the monitored preemption controller (shown as signal 202), transmits preemption data to the requester. In the example, the preemption data indicates that a high priority vehicle is requesting preemption. The vehicle is represented with icon 208. In one embodiment, different icons are used for different priority vehicles. For example, for a high priority emergency vehicle, such as a fire engine, a fire engine icon may be displayed. For a low priority vehicle, such as a mass transit vehicle, a bus icon may be displayed. It will be appreciated that different icons may be chosen for specific vehicle types, which may be identified by the vehicle identifier in the preemption data.

In another embodiment, a third priority level is recognized. The third priority level is referred to as probe priority. In probe priority, the preemption controller is being tested for its ability to receive preemption requests. The preemption controller does not signal the traffic signal controller to preempt the traffic signal for a preemption request having a probe priority. When the monitoring system receives preemption data indicating a probe priority preemption request, an icon other than one depicting an emergency vehicle or one depicting a mass transit vehicle is chosen. For example, the icon may show an automobile with an oversized antenna.

In response to the preemption data indicating that the vehicle is requesting preemption, the vehicle icon is highlighted in the display. In one embodiment, ellipse 210 is added to the display when the vehicle is requesting preemption and that vehicle is within one of the approach maps of the preemption controller. The display also shows dashed line 212 leading from icon 208 to the location 214 on the road from which the vehicle transmitted the preemption request. It may be observed that the vehicle location is within the approach maps 206, which causes the preemption controller to signal a preemption request to the traffic signal controller. Once the preemption controller loses communication with the vehicle and is no longer receiving preemption requests from that vehicle, the vehicle icon is removed from the display.

The display 200 also includes graphical objects 220 that correspond to the phases of the traffic signal controller at the monitored intersection. In the example, there are 8 phases of the traffic signal controller, each represented by one of the objects 220. U.S. Pat. No. 5,734,116 describes the phases of a traffic signal controller. In one embodiment, the display 200 highlights those phases that are green as indicated by the preemption data. The example shows objects 222 and 224, which correspond to phases 2 and 6, respectively, being highlighted with diagonal fill lines. In one embodiment, the objects are colored green. The combination of the highlighted vehicle icon (ellipse 210), which indicate preemption requests from the vehicle, and the green phases 2 and 6 in favor of the requesting vehicle illustrate an active preemption by the traffic signal controller for the vehicle corresponding to vehicle icon 208. In addition to showing which phases are green, the display shows the duration for which the phases have been held green. The example shows phases 2 and 6 having been held green for 81 seconds. Displaying the length of green time for each phase allows the user to observe that the green time was extended for purposes such as transit signal priority (TSP), which provides assurances that the preemption system is operating correctly and providing extended green time in the desired direction.

In addition to the graphical depiction of the preemption data, additional vehicle-specific data may be presented on display 200. The additional vehicle data may be displayed in response to user selection of a vehicle icon (e.g., a double click) in one embodiment. Information such as the vehicle position in GPS coordinates, vehicle speed, vehicle heading, and estimated time of arrival at the intersection may be displayed, as shown by block 230. It will be appreciated that the speed of the vehicle may, in combination with the graphical display, indicate that the approach maps need to be adjusted. For example, if the vehicle is still or moving very slowly, and is within the area defined by the approach maps, this may indicate that the intersection has not yet cleared and the approach maps may need to be enlarged to allow more time to clear the intersection. Other information, which may be useful to display, includes the serial number of the emitter and the vehicle code assigned to the emitter.

The monitoring system displays vehicle icons for all vehicles identified in the preemption data. For example, the preemption controller may have received preemption requests from vehicles that are not within the approach maps of that preemption controller. A vehicle icon is displayed for each such vehicle. In display 200, vehicle 240 corresponds to such a vehicle.

For vehicles in which the preemption data indicate a disable mode, a grayed-out vehicle icon is displayed. The disable mode indicates that an emitter continues to issue signals with an encoded priority level, but the signal does not request preemption. For example, when a bus door is opened to allow passengers on or off the bus, the emitter is set to disable mode so that the bus preemption request is not issued.

In one embodiment, the monitoring system also displays textual data describing the intersection being monitored. This information includes, for example, the name of the intersection and GPS position of the intersection, as shown by block 250. Depending on implementation requirements, this data may be displayed in response to user selection of a traffic signal icon or displayed permanently.

A table 252 is displayed in another embodiment. Table 252 contains a historical list of phase changes that occurred while preemption data was gathered. A list entry contains the phase number, associated identifiers of vehicles, if any, that requested preemption, a timestamp indicating the time the phase started and the duration for which the phase was green. The table 252 may be permanently displayed or selectively displayed in response to user control.

Another embodiment of the monitoring system provides record and playback controls 260, along with display controls 270. The record and playback controls provide the user with the ability to record the preemption data as it is received by the monitoring system and play back the recorded data at a later time. The record and playback controls provide functions such as record, stop, play, step forward, step back, rewind, and fast-forward. The display controls allow the user to zoom in, zoom out, and pan the map. A distance measuring tools is provided to measure the distance from an emitter or preemption controller to the location of the cursor on the map.

Figure 3:
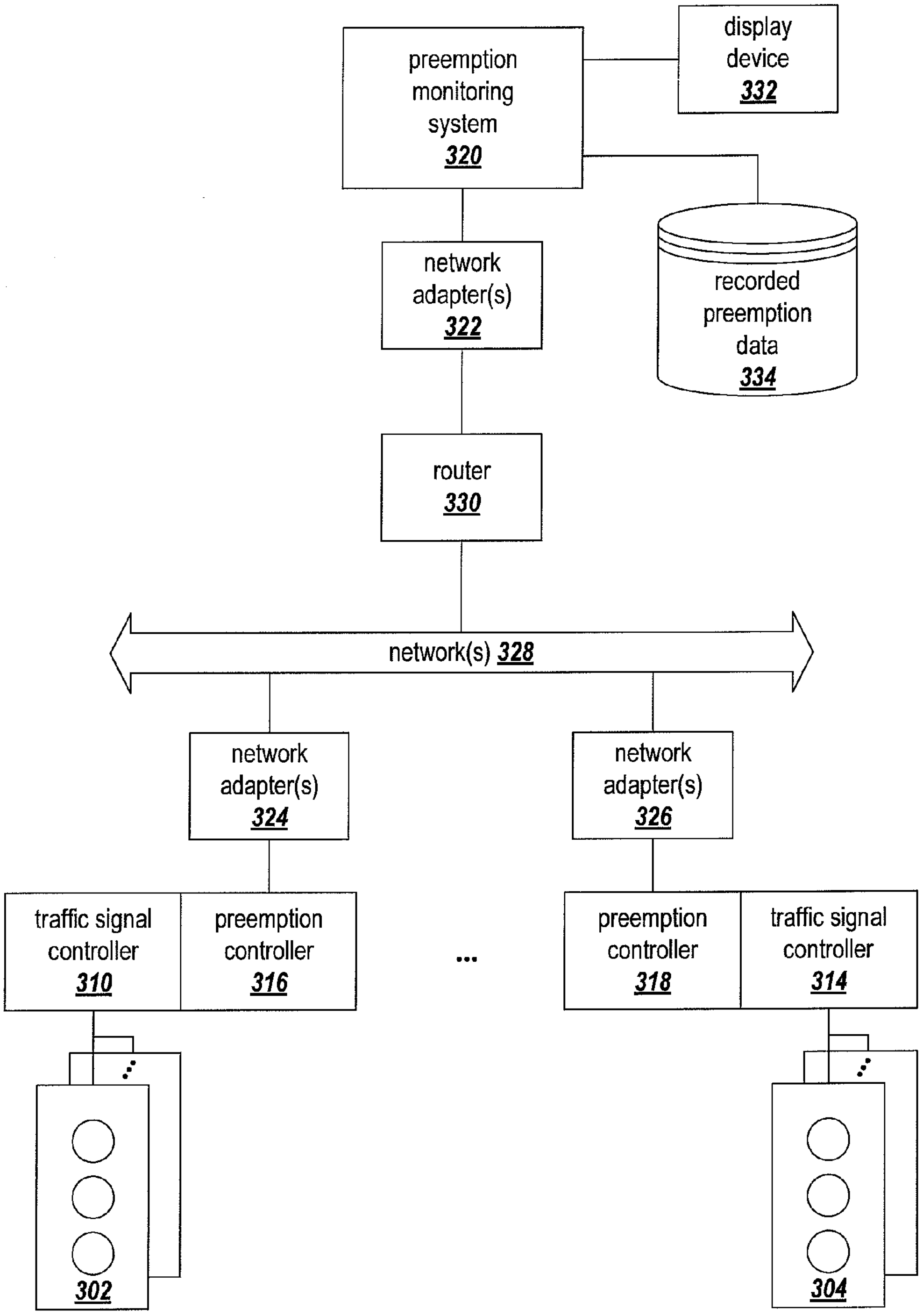
FIG. 3 is a block diagram of a system for monitoring traffic signal preemption in accordance with one or more embodiments of the invention.

FIG. 3 is a block diagram of a system for monitoring traffic signal preemption in accordance with one or more embodiments of the invention. Traffic lights 302 and 304 at intersections with preemption controllers are coupled to traffic signal controllers 310 and 314, respectively. Traffic signal controllers 310 and 314 are connected to respective preemption controllers 316 and 318. A preemption monitoring system 320 and the preemption controllers are respectively coupled to network adapters 322, 324, and 326 for communication over a network 328. In various embodiments, a router or a network switch, as shown by router 330, may be coupled between the network adapter and the network. It is understood the preemption monitoring system 320 and the preemption controllers 316 and 318 may be connected through more than one network, coupled by additional switches and routing resources, including a connection over the Internet.

The preemption monitoring system 320 is additionally coupled to display device 332 and to retentive storage device 334. The display device is used by the preemption monitoring system in displaying in near-real-time, the preemption data from one or more preemption controllers. The retentive storage device stores preemption data that the user has elected to record via the record controls 260 of FIG. 2.

In various embodiments of the present invention, an operator interacts with the preemption monitoring system 320 to select those preemption controllers for which monitoring is desired. The preemption monitoring system establishes connections with those selected preemption controllers and periodically requests the preemption controller to send its most recent preemption data. The preemption monitoring system interprets that data and in response, outputs data for updating a map that is displayed on the display device 332. In response to an operator selecting a record control, the preemption monitoring system stores the preemption data in retentive storage device 334 as it is received from the selected preemption controller(s).

It is understood that numerous network transfer protocols may be used to establish, maintain, and route connections including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

Figure 4:
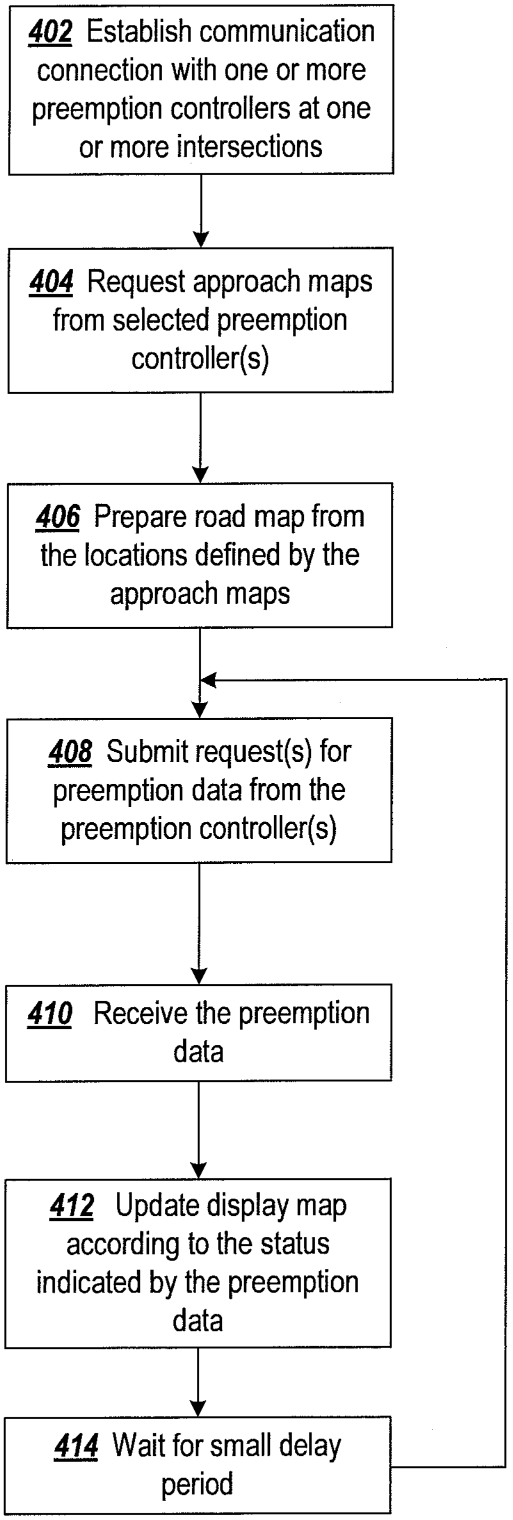
FIG. 4 is a flowchart of an example process for monitoring traffic signal preemption at a plurality of intersections in accordance with an embodiment of the invention.

FIG. 4 is a flowchart of an example process for monitoring traffic signal preemption at a plurality of intersections in accordance with an embodiment of the invention. At step 402, a communication connection is established between the preemption monitoring system and one or more selected preemption controllers. Once a connection is established, the preemption monitoring system at step 404 requests the approach maps from the selected preemption controller(s). The approach maps are only read once since they are unlikely to be changed while monitoring.

At step 406, the preemption monitoring system prepares a road map and displays the map on a computer monitor, for example. In one embodiment, the GPS data defined in the approach maps is used to obtain an electronic road map from a geographic information system. The preemption monitoring system then displays the electronic road map.

The preemption monitoring system begins requesting preemption data from the selected preemption controller(s) at step 408. The selected preemption controller responds with tracking and preemption information.

At step 410, the preemption monitoring system receives the preemption data from the selected preemption controller (s). The preemption data include vehicle identifier, velocity, priority level, estimated time of arrival, position, heading, distance to intersection, emitter identifier, and green phases. At step 412 the displayed road map is updated accordingly. Examples of the updates to the map include those described in FIG. 2.

For GPS-based preemption controllers and emitters, updates to the map may include those updates shown in FIG. 2. For IR-based systems, however, the information conveyed from the preemption controller to the preemption monitoring system would be more limited. Specifically, the preemption data would not include speed, location, heading, or estimated time of arrival data. Rather, the information may be limited to timestamps of preemption requests and whether or not the selected preemption controller(s) is requesting preemption from the traffic signal controller, and the green phases of the traffic signal controller and the associated durations. In addition, for an IR-based system there would be no approach maps displayed. The position of the vehicle icon on the road map would be estimated based on the signal strength of the emitter.

At step 414, the preemption monitoring system waits for a small period of time (e.g., 1 second) before returning to step 408 to submit another request(s) for preemption data from the selected preemption controller(s).

Those skilled in the art will appreciate that various alternative computing arrangements, including one or more processors and a memory arrangement configured with program code, can be configured to perform the processes of the different embodiments of the present invention.

Figure 5:
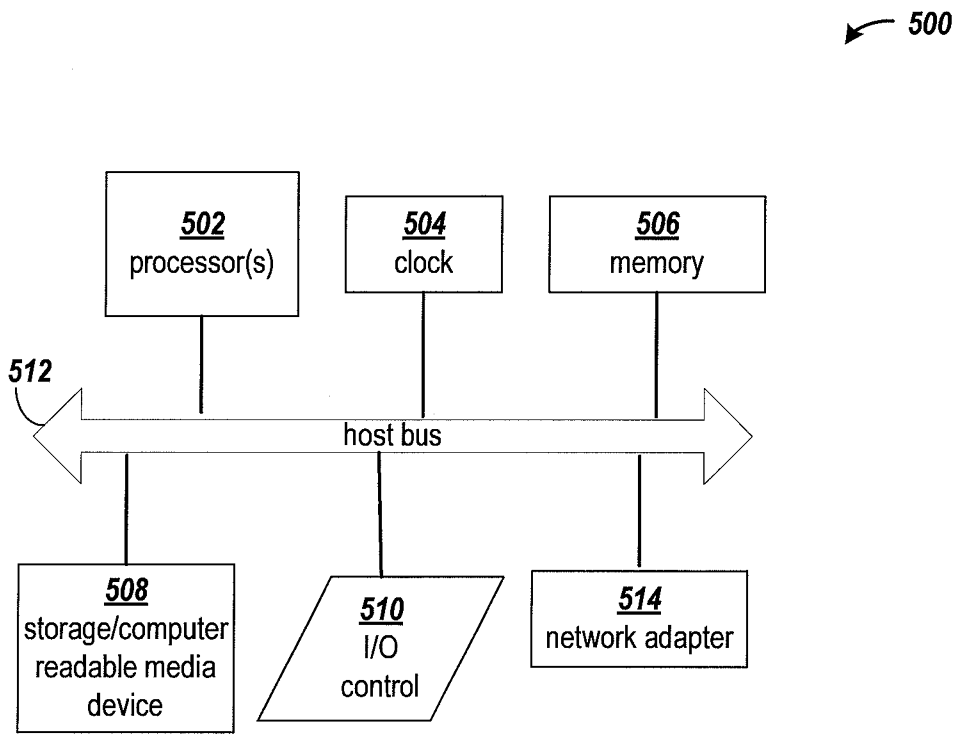
FIG. 5 is a block diagram of an example computing arrangement which can be configured to implement the processes performed by the preemption controller as described herein.

FIG. 5 is a block diagram of an example computing arrangement which can be configured to implement the processes performed by the preemption controller as described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory unit 506, a storage unit 508, a network adapter 514, and an input/output control unit 510 coupled to host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, CISC, pipelined, etc.).

The memory unit 506 typically includes multiple levels of cache memory, a main memory. The storage unit 508 may include local and/or remote persistent storage such as provided by magnetic disks (not shown), flash, EPROM, or other non-volatile data storage. The storage unit may be read or read/write capable. Further, the memory unit 506 and storage unit 508 may be combined in a single arrangement.

The processor arrangement 502 executes the software in memory unit 506 and/or storage unit 508, reads data from and stores data to the memory unit 506 and/or storage unit 508, and communicates with external devices through the input/output control unit 510. These functions are synchronized by the clock signal generator 504. The resource of the computing arrangement may be managed by either an operating system (not shown), or a hardware control unit (not shown).

The present invention is thought to be applicable to a variety of systems for a preemption controller. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for monitoring traffic signal preemption at one or more intersections, comprising:

displaying a road map with a computer system, wherein the road map includes a plurality of roads and intersections;

periodically transmitting preemption data from at least one preemption controller at a respective intersection to the computer system;

displaying at least one traffic signal icon proximate the respective intersection on the road map;

displaying a plurality of approach maps associated with the intersection and preemption controller, wherein the approach maps overlay one or more roads leading to the intersection, and each of the approach maps defines boundaries of a respective area, the at least one preemption controller in response to a preemption request being emitted from any of the respective areas, will process the preemption request, and the at least one preemption controller in response to the preemption request not being emitted from any of the respective areas, will not process the preemption request; and in response to receiving the preemption data, updating the road map to include a vehicle icon at a location on the road map corresponding to a location of a vehicle transmitting a preemption request as indicated by the preemption data.

2. The method of claim 1, further comprising requesting the plurality of approach maps by the computer system from the preemption controller.

3. The method of claim 1, further comprising displaying icons representative of other preemption controllers in communication with the at least one preemption controller.

4. The method of claim 1, wherein the vehicle icon at the location on the road map includes a graphical indicator positioned at a location indicated by the preemption data on one of the plurality of roads.

5. The method of claim 1, wherein the vehicle icon is indicative of a priority level of the vehicle transmitting the preemption request.

6. The method of claim 5, wherein for a high priority level vehicle transmitting the preemption request, an emergency vehicle icon is displayed.

7. The method of claim 6, wherein for a low priority level vehicle transmitting the preemption request, a mass transit vehicle icon is displayed.

8. The method of claim 1, further comprising, in response to user selection of the vehicle icon, displaying textual data describing a geographical location of the vehicle.

9. The method of claim 1, further comprising, in response to user selection of the vehicle icon, displaying textual data describing speed of the vehicle.

10. The method of claim 1, further comprising, in response to user selection of the vehicle icon, displaying textual data describing heading of the vehicle.

11. The method of claim 1, further comprising, in response to user selection of the vehicle icon, displaying textual data describing an estimated time of arrival of the vehicle at the respective intersection.

12. The method of claim 1, further comprising, in response to user selection of the traffic signal icon, displaying textual data describing a geographical location of the respective intersection.

13. The method of claim 1, further comprising, in response to user selection of the traffic signal icon, displaying textual data indicating a name of the respective intersection.

14. The method of claim 1, further comprising:

displaying respective graphical icons corresponding to phases of a traffic signal controller at the respective intersection; and for each phase for which the traffic signal controller activates a green light at the respective intersection, coloring each corresponding graphical icon green.

15. The method of claim 14, further comprising displaying textual data indicating a length of time for which the traffic signal controller holds a phase green at the respective intersection.

16. The method of claim 15, further comprising displaying a list of vehicle identifiers for which preemption requests were issued during each green phase.

17. The method of claim 1, further comprising altering appearance of the vehicle icon in response to the preemption data indicating that the vehicle is in disable mode.

18. A system for monitoring traffic signal preemption at one or more intersections, comprising:

a processor;

a memory arrangement coupled to the processor, wherein the memory arrangement is configured with instructions that are executable by the processor for performing steps including:

outputting data for displaying a road map, wherein the road map includes a plurality of roads and intersections;

periodically requesting and receiving preemption data from at least one preemption controller at a respective intersection;

displaying at least one traffic signal icon proximate the respective intersection on the road map;

displaying a plurality of approach maps associated with the intersection and preemption controller, wherein the approach maps overlay one or more roads leading to the intersection, and each of the approach maps defines boundaries of a respective area, the at least one preemption controller in response to a preemption request being emitted from any of the respective areas, will process the preemption request, and the at least one preemption controller in response to the preemption request not being emitted from any of the respective areas, will not process the preemption request; and in response to receiving the preemption data, outputting data for updating the road map to include a vehicle icon at a location on the road map corresponding to a location of a vehicle transmitting a preemption request as indicated by the preemption data.

19. An article of manufacture, comprising:

a tangible computer-readable storage medium configured with instructions that are executable by one or more processors for monitoring traffic signal preemption at one or more intersections, wherein the instructions when executed by the one or more processors cause the one or more processors to perform operations of:

outputting data for displaying a road map, wherein the road map includes a plurality of roads and intersections;

periodically transmitting preemption data from at least one preemption controller at a respective intersection to a computer system;

displaying at least one traffic signal icon proximate the respective intersection on the road map;

displaying a plurality of approach maps associated with the intersection and preemption controller, wherein the approach maps overlay one or more roads leading to the intersection, and each of the approach maps defines boundaries of a respective area, the at least one preemption controller in response to a preemption request being emitted from any of the respective areas, will process the preemption request, and the at least one preemption controller in response to the preemption request not being emitted from any of the respective areas, will not process the preemption request; and in response to receiving the preemption data, outputting data for updating the road map to include a vehicle icon at a location on the road map corresponding to a location of a vehicle transmitting a preemption request as indicated by the preemption data.

* * * * *